July 5, 1955  J. K. GAYLORD  2,712,474
VEHICLE WHEEL COVER STRUCTURE
Filed Feb. 2, 1953  2 Sheets-Sheet 1
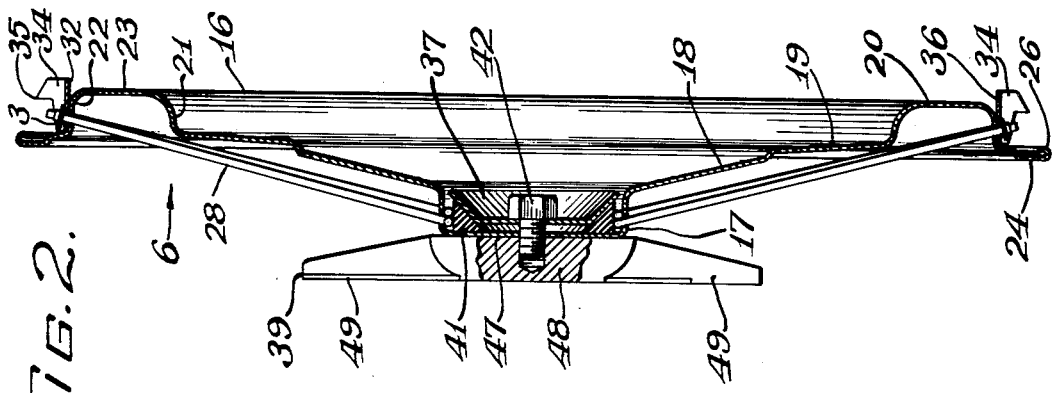
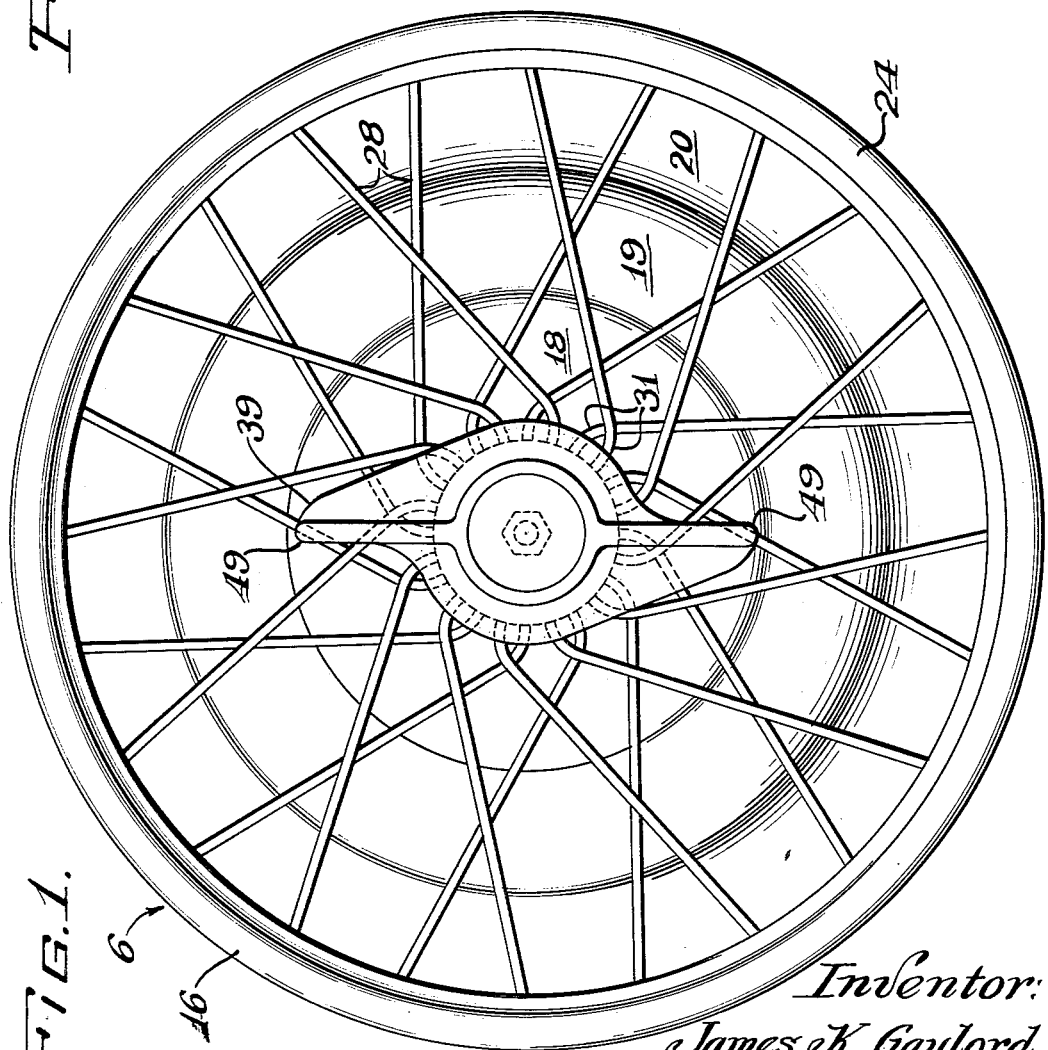
Inventor:
James K. Gaylord
By Gary Desmond & Parker
Attys.

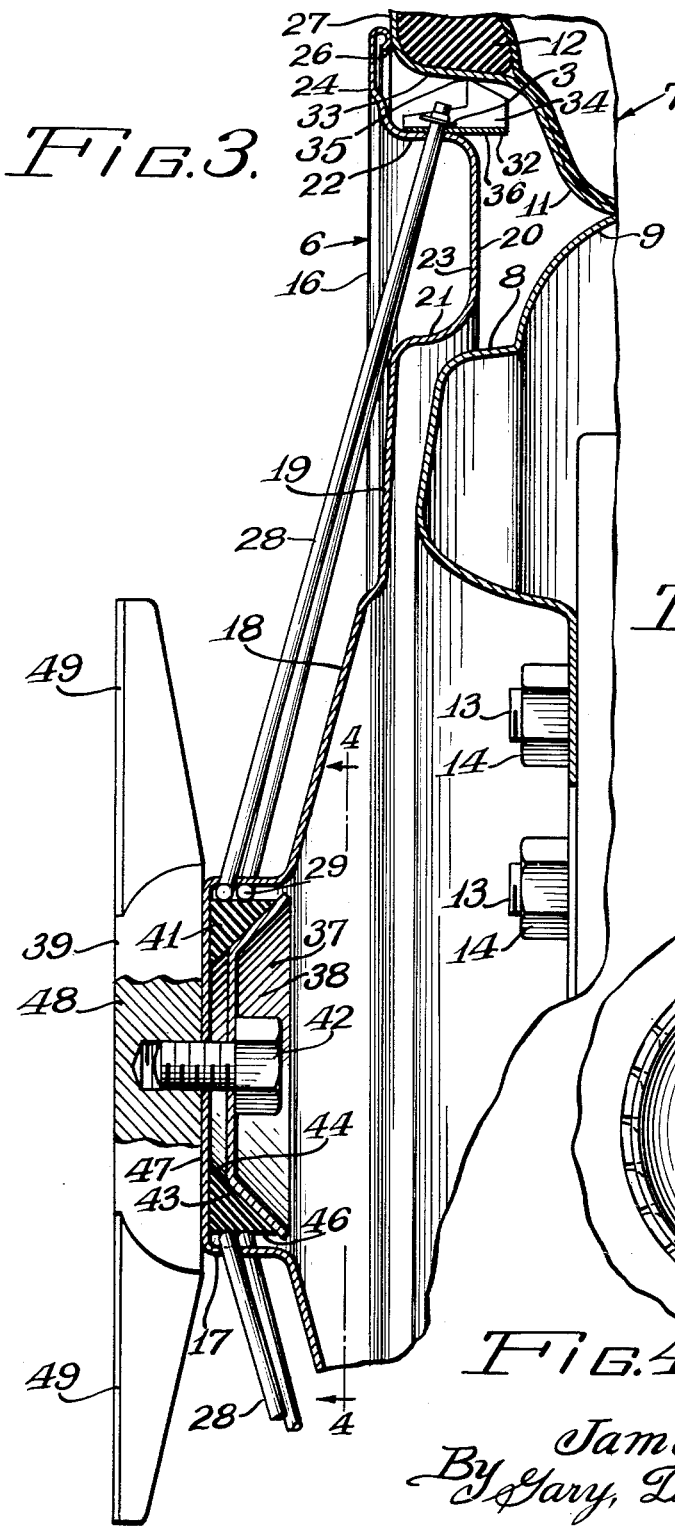
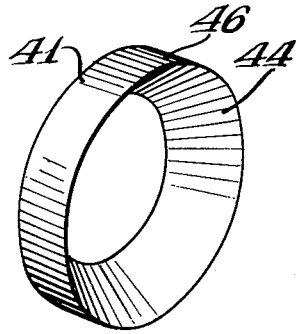
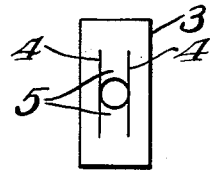
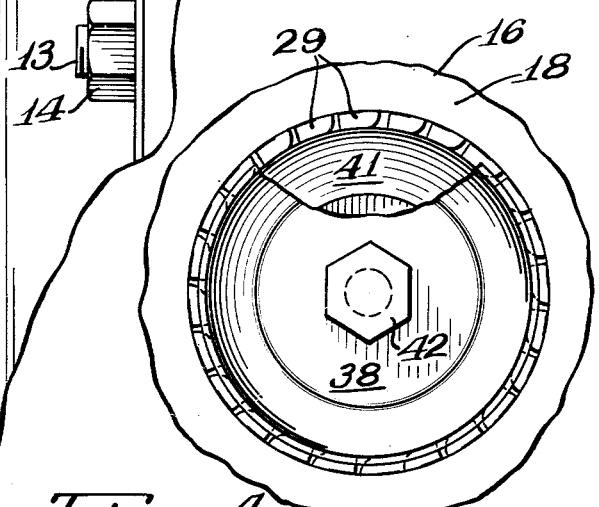

2,712,474
Patented July 5, 1955

2,712,474
VEHICLE WHEEL COVER STRUCTURE

James K. Gaylord, Chicago, Ill., assignor to Gaylord Products, Incorporated, Chicago, Ill., a corporation of Delaware Application February 2, 1953, Serial No. 334,490

9 Claims. (Cl. 301—37)

This invention relates to a vehicle wheel cover structure and more particularly to a cover structure comprising a cover plate adapted to be detachably secured upon a wheel to enhance the appearance thereof and to protect parts of the wheel from water, mud, etc.

This invention further contemplates the provision of a wheel cover structure embodying a cover plate formed to provide a hub portion and a rim portion, the latter being provided with an annular inturned lip for annular abutting engagement against the side wall of a tire rim, and the cover plate having a plurality of circumferentially spaced fastening members thereon for engagement with the inner wall of the tire rim to secure the cover structure in fixed position upon a vehicle wheel.

This invention further contemplates the provision of a wheel cover structure having a plurality of wire spokes extending between the hub portion and the rim portion of the cover plate to impart the appearance of a wire spoke wheel when the cover structure is applied to a conventional disk wheel.

This invention further contemplates the provision of a cover structure embodying a circular cover plate formed with a plurality of concentric integral annular sections adapted to be coated with a suitable material or materials and serving as a background for the radiating spokes. For example, the annular sections may be provided with a bright light reflecting surface to visibly reflect a single row of spokes to effect the illusion of a double row of spokes, or the sections may be coated with a non-reflective light absorbing material to give the impression of "looking through" the spokes or of the spokes standing out in space.

This invention further contemplates the provision of a wheel cover structure embodying a combined hub and trim plate having a wedge clamping device coaxial therewith to engage and hold the inner ends of the wire spokes against movement relative to the plate, parts of said device being enclosed within the hub portion of the plate, and another part of the device being engaged against the outboard side of the hub portion.

This invention further contemplates the provision of a wedge clamping device embodying a resilient clamping ring of wedge section engageable against the inner ends of the wire spokes to prevent vibration and noise during use of the cover structure on a wheel.

This invention embodies other novel features, details of construction and arrangement of parts which are hereinafter set forth in the specification and claims, and illustrated in the accompanying drawings, wherein:

Fig. 1 is a front elevational view illustrating a cover structure embodying features of the present invention.

Fig. 2 is a diametral sectional view of the structure illustrated in Fig. 1.

Fig. 3 is an enlarged fragmentary sectional view illustrating the cover structure as applied to a conventional disk wheel.

Fig. 4 is a fragmentary sectional view taken along the line 4—4 of Fig. 3.

Fig. 5 is a detail perspective view illustrating the resilient wedge ring embodied in the clamping device employed to engage the inner ends of the wire spokes against the hub portion of the cover plate.

Fig. 6 is an enlarged plan view illustrating a fastener employed to secure a wire spoke to a cover plate.

Referring now to the drawings for a better understanding of this invention, the cover structure 6 is shown as applied to a conventional disk wheel 7 comprising the usual support plate 8 provided with an annular flange 9 secured to a tire rim 11 adapted to receive a tube and casing unit 12, the support plate being formed with apertures to receive the usual wheel mounting bolts 13 threaded to receive nuts 14.

The cover structure 6 is shown as comprising a circular cover plate 16 embodying a cup-shape hub portion 17, inner and outer annular step portions 18 and 19, an annular recess portion 20 defined by inner and outer walls 21 and 22 and a connecting web 23, and a rim portion 24 having an annular inturned lip 26 for annular line contact engagement against the outer side wall 27 of the tire rim 11.

To enhance the ornamental appearance of the cover structure, a row of radiating wire spokes 28 are provided on the outboard side of the cover plate 16, the inner ends of the spokes extending through circumferentially spaced apertures formed in the hub portion 17 and bent laterally to form heads 29 for engagement against the inner annular surface of the hub portion, and the outer ends of the spokes extending through circumferentially spaced apertures formed in the outer wall 22. The wire spokes may extend radially from the hub 17 to the outer wall 22 or may be arranged in alternate crosswise position, as illustrated in Fig. 1. It will also be apparent that the spokes may extend straight from the hub to the outer wall 22 or, if desired, may be bent adjacent the hub at 31, as shown in Fig. 1.

A plurality of shoes 32 are circumferentially spaced about the outer wall 22 for engagement against the annular inner wall section 33 of the tire rim 11. As set forth in greater detail and claimed in applicant's copending application Serial No. 324,733, filed December 8, 1952, each shoe 32 is formed of sheet metal bent U-shape to provide side walls 34 and a connecting web 36 having a pair of spaced apertures to receive the outer ends of related adjacent spokes, the shoes being secured to their related spokes by means of fasteners 3. As illustrated in Fig. 6, the fasteners 3 may be in the form of a length of resilient spring metal having parallel slits 4—4 defining a pair of opposed resilient fingers 5—5 to engage opposite sides of a spoke inserted therebetween to prevent outward displacement of related shoes. The side walls 34 of each shoe are formed with sharp points at 35 to cut into the relatively soft inner wall section 33 of the tire rim 11 to secure the cover structure to the wheel.

To prevent vibration and noise, it is necessary to secure the wire spokes 28 against movement relative to the cover plate 16 and this result is simply and inexpensively accomplished by means of a clamping device, indicated generally at 37, and shown as comprising inner and outer clamping members 38 and 39, a resilient rubber ring 41, and a cap screw 42. The inner clamping member 38 is formed with a frusto-conical face 43 for engagement with a frusto-conical surface 44 on the ring 41 to expand the latter into tight engagement against the heads 29 of the spokes 28 when the clamping members are moved toward each other by the cap screw 42.

As illustrated in Figs. 3 and 5, the resilient rubber ring 41 is formed with a cylindrical outer surface 46 to engage the heads 29 and is engaged against the inner side of the front wall 47 of the hub portion 17. The cap screw 42 extends through apertures formed in the inner clamping member 38 and front wall 47 for threaded engagement in the outer clamping member 39. To further enhance the appearance of the cover structure, the outer clamping member 39 is formed with a hub portion 48 and diametrically opposed wing portions 49—49 to resemble the appearance of the conventional wing nuts employed to secure the wheels on racing cars.

By tightening the cap screw 42 the inner clamping member 38 acts to expand the rubber ring 41 into tight engagement against the heads 29 to prevent vibration of the spokes and resultant noise during use of the cover structure on the wheel of a vehicle. After the heads 29 have been clamped against the inner annular surface of the hub portion 17 by the clamping device 37, the fasteners 3 are mounted on the outer ends of their respective spokes 28 to tightly clamp their related shoes 34 against the outer annular surface of the outer wall 22. The ends of the resilient fingers 5—5 of the fasteners 3 bite into their related spokes to secure the fasteners in adjusted position axially of the spokes.

The cover structure 6 is mounted upon a wheel 7 by merely positioning the shoes 32 within the annular wall 33 of the tire rim 11 and then pushing the structure toward the wheel until the inturned lip 26 on the cover 16 is in tight annular engagement against the side wall 27 of the tire rim. When the cover structure is thus mounted upon a wheel, the sharp points 35 on the shoes bite into the tire rim wall 33 to secure the structure in fixed position.

To effect the appearance of a wire wheel having the conventional two spaced rows of wire spokes, the outer surface of the step portions 18 and 19 may be plated with chromium, nickel or the like to provide a bright light reflecting mirror surface which reflects the spokes 46 and gives the visual impression of double the number of spokes. The portion of a conventional wire spoke wheel adjacent the rim is normally in shadow, due to overhang of the rim and to the fact that an observer looks through the wheel. To create this illusion, the outer side of the walls 21 and 22 and web 23 defining the annular recess 20 may be provided with a dark, light absorptive coating. If desired, the entire outer surface of the cover plate 16 beyond the hub 17 may be provided with a dark, light absorptive coating to give a visual impression of "looking through" the spokes or of spokes standing out in space.

While this invention has been shown in but one form, it is obvious to those skilled in the art that it is not so limited, but is susceptible of various changes and modifications without departing from the spirit and scope of the claimed invention.

I claim as my invention:

1. In a vehicle wheel cover structure, a cover plate having a cup-shape hub portion and an annular wall, said hub portion and annular wall having circumferentially spaced apertures, wire spokes radiating adjacent the outboard face of the cover plate with their ends projecting through said apertures, said spokes having heads on their inner ends for engagement with an inner annular surface of the hub portion, and clamping means including an expandable ring having a peripheral surface movable radially toward and tightly engaging said heads against said annular surface.

2. A vehicle wheel cover structure comprising a circular cover plate having an annular outer wall and a cup-shape hub portion having an inner annular surface, wire spokes radiating about the axis of said plate with their ends projectnig through circumferentially spaced apertures in said outer annular wall and hub portion of the cover plate, heads provided on the inner ends of the spokes engaging the inner surface of said hub portion, and clamping means including a resilient rubber ring having a peripheral surface movable radially toward and snugly engaging and clamping said heads against the inner annular surface of the hub portion.

3. A vehicle wheel cover structure comprising a circular cover plate having an annular outer wall and a cup-shape hub portion having an inner annular surface, wire spokes radiating about the axis of said plate with their ends projecting through circumferentially spaced apertures in said outer annular wall and hub portion of the cover plate, heads provided on the inner ends of the spokes engaging the inner surface of said hub portion, clamping means including a resilient rubber ring having a peripheral surface movable radially toward and snugly engaging and clamping said heads against the inner annular surface of the hub portion, said ring being of wedge-shape section having an internal frusto-conical face, an inner clamping member engaging said face, and means to move said member axially of said cover plate to expand said ring radially toward the inner annular surface of the hub portion.

4. A vehicle wheel cover structure comprising a circular cover plate having an annular outer wall and a cup-shape hub portion having an inner annular surface, wire spokes radiating about the axis of said plate with their ends projecting through circumferentially spaced apertures in said outer annular wall and hub portion of the cover plate, heads provided on the inner ends of the spokes engaging the inner surface of said hub portion, clamping means including a resilient rubber ring having a peripheral surface movable radially toward and snugly engaging and clamping said heads against the inner annular surface of the hub portion, said ring being of wedge-shape section having an internal frusto-conical face, an inner clamping member engaging said face, and means to move said member axially of said cover plate to expand said ring radially toward the inner annular surface of the hub portion, said latter means including an outer clamping member and a clamping screw threaded thereinto, the outer clamping member having the general appearance of a wing nut of the type employed in mounting wheels on racing cars.

5. A vehicle wheel cover structure comprising a circular cover plate having an annular outer wall and a cup-shape hub portion having an inner annular surface, wire spokes radiating about the axis of said plate with their ends projecting through circumferentially spaced apertures in said outer annular wall and hub portion of the cover plate, heads provided on the inner ends of the spokes engaging the inner surface of said hub portion, clamping means including a resilient rubber ring having a peripheral surface movable radially toward and snugly engaging and clamping said heads against the inner annular surface of the hub portion, and means secured on the outer ends of said spokes for engagement with a tire rim to mount the cover structure on a wheel.

6. A vehicle wheel cover structure comprising a circular cover plate having an annular outer wall and a cup-shape hub portion having an inner annular surface, wire spokes radiating about the axis of said plate with their ends projecting through circumferentially spaced apertures in said outer annular wall and hub portion of the cover plate, heads provided on the inner ends of the spokes engaging the inner surface of said hub portion, clamping means including a resilient rubber ring having a peripheral surface movable radially toward and snugly engaging and clamping said heads against the inner annular surface of the hub portion, and means secured on the outer ends of said spokes and having sharply pointed ends for engagement with a tire rim to mount the cover structure on a wheel when said structure is moved axially toward the wheel.

7. A vehicle wheel cover structure comprising a circular cover plate having an annular outer wall and a cup-shape hub portion having an inner annular surface, wire spokes radiating about the axis of said plate with their ends projecting through circumferentially spaced apertures in said outer annular wall and hub portion of the cover plate, heads provided on the inner ends of the spokes engaging the inner surface of said hub portion, and clamping means including an inner clamping member and a resilient rubber ring having a peripheral surface movable radially toward and snugly engaging and clamping said heads against the inner annular surface of the hub portion, said inner clamping member and ring having abutting complementary frusto-conical surfaces.

8. In a vehicle wheel cover structure, a circular cover plate having a hub portion, annular step portions, an annular recess portion, and a rim portion, said hub portion having a cylindrical wall merging with a front wall, said recess portion having an annular outer wall merging with the rim portion, wire spokes extending between said cylindrical wall and said annular outer wall and having their ends mounted in and projecting through apertures provided therein, heads provided on the inner ends of said spokes in abutting engagement against the inner surface of said cylindrical wall, an expandable ring disposed within said hub portion in abutting engagement against the front wall thereof and spaced relation to said cylindrical wall, an inner clamping member having a frusto-conical face extending internally of said ring, and means to move said member into said ring to expand the latter radially into engagement with the said heads to reduce vibration of the wire spokes.

9. In a vehicle wheel cover structure, a circular cover plate having a hub portion, annular step portions, an annular recess portion, and a rim portion, said hub portion having a cylindrical wall merging with a front wall, said recess portion having an annular outer wall merging with the rim portion, wire spokes extending between said cylindrical wall and said annular outer wall and having their ends mounted in and projecting through apertures provided therein, heads provided on the inner ends of said spokes, an expandable ring disposed within said hub portion in abutting engagement against the front wall thereof and radially spaced from said cylindrical wall, an inner clamping member having a frusto-conical face extending internally of said ring, means to move said member into said ring to expand the latter radially into engagement with the said heads to reduce vibration of the wire spokes, said means including an outer clamping member engaging the outboard side of said front wall, and a threaded member interconnecting said inner and outer clamping members.

References Cited in the file of this patent

UNITED STATES PATENTS

| | | |
|---|---|---|
| 2,069,952 | Hoffman | Feb. 9, 1937 |
| 2,159,881 | Booth | May 23, 1939 |
| 2,564,905 | Kaye | Aug. 21, 1951 |
| 2,650,862 | Lyon | Sept. 1, 1953 |

FOREIGN PATENTS

| | | |
|---|---|---|
| 714,587 | France | Sept. 7, 1931 |